G. B. HAMLIN.
Thrashing Machine.

No. 99,888. Patented Feb. 15, 1870.

Witnesses.

Inventor
George B. Hamlin

United States Patent Office.

GEORGE B. HAMLIN, OF WILLIMANTIC, CONNECTICUT.

Letters Patent No. 99,888, dated February 15, 1870.

IMPROVEMENT IN THRESHING-MACHINES.

The Schedule referred to in these Letters Patent and making part of the same

*To all whom it may concern:*

Be it known that I, GEORGE B. HAMLIN, of Willimantic, in the town of Windham, county of Windham, in the State of Connecticut, have invented a new and useful Improvement in Threshing-Machines; and I do hereby declare that the following is a full, clear, and exact description thereof, which will enable others skilled in the art to make and use the same, reference being had to the accompanying drawings forming part of this specification, in which—

Similar letters of reference indicate corresponding parts.

Figure 1:
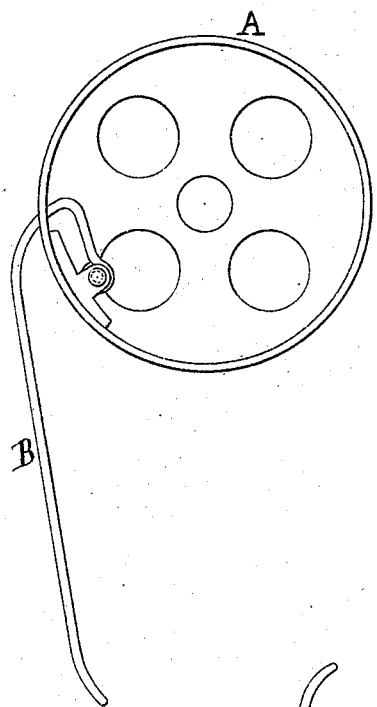
Figure 1 represents, in end view, a cylinder with one flail arm, illustrating my improvement.
Figure 2:
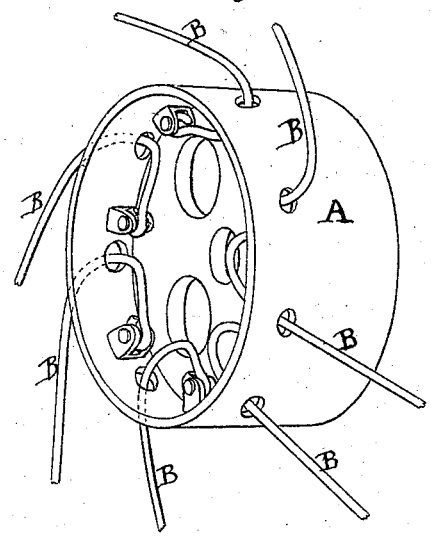
Figure 2 represents a cylinder in perspective, illustrating more fully my invention, showing the position of the several flail arms.
Figure 3:
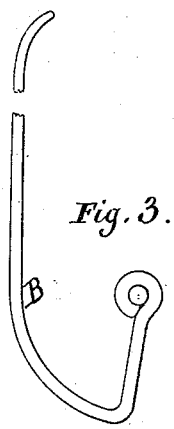
Figures 3 and 4 represent, on a larger scale, my improved flail arm.
Figure 4:

My invention has for its object to improve the construction of threshing cylinders and rotating teeth or beaters, so as to make them more efficient in use and less liable to get out of order, or to be broken, than when constructed in the ordinary manner; and It consists in the construction and combination of the above-named parts, as hereinafter more fully described.

A represents the pulley or cylinder, forming a drum or shell, attached to the shaft by one set of arms C, in the center of the same, making it easy of access when needing repairs, and preventing the winding of straw between the arms and frame, so prevalent in ordinary machines.

B are teeth or beaters, which pass through small orifices in the drum or shell A, with circular heel attached to the inner surface of said drum A by lugs or other means, the circle being so formed as to pass in a direct line through the small orifice in the drum A, when they are thrown forward at right angles by the certrifugal force until the force of the blow is imparted to the grain, when they are rapidly folded back without impeding the revolutions of the cylinder.

By this combination the drum or pulley presents a smooth surface to the action of the straw, preventing the throwing back the grain and straw by the adhesion of the same to the rough surface of ordinary cylinders.

Having thus described my invention,

I claim as new, and desire to secure by Letters Patent—

The curved flail arms or beaters B, passing through suitable apertures in the shell of the cylinder, and attached by a hinge joint, or its equivalant, to the interior of the cylinder, substantially as shown and described, for the purposes specified.

The above specification of my invention signed by me this 29th day of Sepember, 1869.

GEORGE B. HAMLIN.

Witnesses:
    J. D. WHEELER, 2d,
    E. B. SUMNER.